United States Patent
Magazine et al.

(10) Patent No.: US 11,386,441 B2
(45) Date of Patent: Jul. 12, 2022

(54) ENHANCING EMPLOYEE ENGAGEMENT USING INTELLIGENT WORKSPACES

(71) Applicant: Citrix Systems, Inc., Fort Lauderdale, FL (US)

(72) Inventors: Anuj Magazine, Bengaluru (IN); Praveen Raja Dhanabalan, Bengaluru (IN); Anudeep Athlur, Bengaluru (IN)

(73) Assignee: Citrix Systems, Inc., Fort Lauderdale, FL (US)

( * ) Notice: Subject to any disclaimer, the term of this patent is extended or adjusted under 35 U.S.C. 154(b) by 322 days.

(21) Appl. No.: 16/387,055

(22) Filed: Apr. 17, 2019

(65) Prior Publication Data

US 2020/0334698 A1 Oct. 22, 2020

(51) Int. Cl.
*G06Q 30/02* (2012.01)
*H04L 67/50* (2022.01)

(52) U.S. Cl.
CPC ......... *G06Q 30/0203* (2013.01); *H04L 67/22* (2013.01)

(58) Field of Classification Search
None
See application file for complete search history.

(56) References Cited

U.S. PATENT DOCUMENTS

| | | | |
|---|---|---|---|
| 10,565,531 B1* | 2/2020 | Heller | H04W 12/08 |
| 2011/0029665 A1* | 2/2011 | Wenig | H04L 41/0213 |
| | | | 709/224 |
| 2011/0137808 A1* | 6/2011 | Meyer | G06Q 10/083 |
| | | | 705/304 |
| 2014/0244329 A1* | 8/2014 | Urban | G06Q 10/063114 |
| | | | 705/7.15 |
| 2014/0298260 A1* | 10/2014 | Abowd | G06Q 30/0203 |
| | | | 715/810 |
| 2017/0344541 A1* | 11/2017 | Haeusler | G06F 16/93 |
| 2019/0095843 A1* | 3/2019 | Muthuswamy | G06Q 10/06398 |
| 2019/0139063 A1* | 5/2019 | Lamm | H04L 67/306 |
| 2019/0205839 A1* | 7/2019 | Dotan-Cohen | |
| | | | G06Q 10/063116 |
| 2019/0279138 A1* | 9/2019 | Koga | G06Q 10/06398 |
| 2020/0090087 A1* | 3/2020 | Singh | G06Q 10/06398 |

FOREIGN PATENT DOCUMENTS

CA 2731029 A1 * 8/2012 ............ G06Q 10/06

OTHER PUBLICATIONS

Parizi, Reza M., Paola Spoletini, and Amritraj Singh. "Measuring team members' contributions in software engineering projects using git-driven technology." 2018 IEEE Frontiers in Education Conference (FIE). IEEE, (Year: 2018).*

* cited by examiner

*Primary Examiner* — Shelby A Turner
(74) *Attorney, Agent, or Firm* — Foley & Lardner LLP

(57) ABSTRACT

A machine learning system may monitor usage of network or hosted resources by users or employees, and may dynamically generate short or "micro" surveys for immediate presentation. These surveys may be aggregated and analyzed by the machine learning system, reducing delays of responses. As a result, engagement may be measured in real-time or near real-time, actionable insights generated, and responsive actions taken. The machine learning system may monitor various interactions of users or employees with a virtual or hosted environment or workspace, including connections to virtual machines, remote desktop applications, SaaS applications, web applications, or other such entities, as well as environmental characteristics such as network location and/or quality.

15 Claims, 10 Drawing Sheets

ENHANCING EMPLOYEE ENGAGEMENT USING INTELLIGENT WORKSPACES

FIELD OF THE DISCLOSURE

The present application generally relates to systems and methods for tracking and enhancing user and employee engagement through the use of network-based tools and hosted resources, including but not limited to hosted desktops and applications and Software-as-a-Service applications.

BACKGROUND

Traditional methods of measuring employee or user engagement include conducting periodic surveys, sometimes anonymized, and typically at long intervals, such as once a year. These surveys may be time-consuming, with many questions to fill out, leading to user frustration. Spacing out the surveys over long periodic intervals attempts to address this frustration, but results in lower accuracy if users cannot remember incidents from early in the time period, and fail to accurately capture dynamically changing perceptions about the environment or workspace. Long surveys may also take a relatively long time to analyze, resulting in delays before addressing any issues raised in the survey results.

SUMMARY

This Summary is provided to introduce a selection of concepts in a simplified form that are further described below in the Detailed Description. This Summary is not intended to identify key features or essential features, nor is it intended to limit the scope of the claims included herewith.

Instead of using traditional surveys presented at long periodic intervals, a machine learning system may monitor usage of network or hosted resources by users or employees, and may dynamically generate short or "micro" surveys for immediate presentation. These surveys may be aggregated and analyzed by the machine learning system, reducing delays of responses. As a result, engagement may be measured in real-time or near real-time, actionable insights generated, and responsive actions taken. The machine learning system may monitor various interactions of users or employees with a virtual or hosted environment or workspace, including connections to virtual machines, remote desktop applications, SaaS applications, web applications, or other such entities, as well as environmental characteristics such as network location and/or quality.

In one aspect, the present disclosure is directed to a method for generating user engagement surveys. The method includes identifying, by an application server, completion of use of a resource provided by the application server and accessed by a plurality of computing devices. The method also includes comparing, by the application server, a time of access of the resource by each of the plurality of computing devices to a threshold. The method also includes determining, by the application server, that a time of access of the resource by a first computing device of the plurality of computing devices exceeds the threshold. The method also includes, responsive to the determination: generating, by the application server, a survey identifying a user of the first computing device; and transmitting the generated survey, by the application server, to each of the plurality of computing devices other than the first computing device.

In some implementations, the method includes identifying transmission of a document generated using the resource to a second computing device. In some implementations, the method includes receiving, by the application server from a computing device of the plurality of computing devices, a request to terminate use of the resource.

In some implementations, the method includes determining the threshold as an average time of access of the resource by each of the plurality of computing devices. In a further implementation, the method includes adjusting, for each of the plurality of computing devices, a time of access of the resource by a predetermined coefficient corresponding to a role of a user of the corresponding computing device.

In some implementations, the method includes receiving a plurality of responses to the generated survey, by the application server from each of the plurality of computing devices other than the first computing device; and aggregating the plurality of responses. In a further implementation, the method includes transmitting the aggregated plurality of responses to the first computing device. In another further implementation, the method includes generating an aggregated score from a plurality of scores of the corresponding plurality of responses.

In another aspect, the present disclosure is directed to a system for generating user engagement surveys. The system includes an application server providing access to a resource via a network interface to each of a plurality of computing devices. The application server is configured to compare a time of access of the resource by each of the plurality of computing devices to a threshold; and determine that a time of access of the resource by a first computing device of the plurality of computing devices exceeds the threshold. The application server is also configured to, responsive to the determination: generate a survey identifying a user of the second computing device; and transmit the generated survey to each of the plurality of computing devices other than the first computing device.

In some implementations, the application server is further configured to identify transmission of a document generated using the resource to a third computing device. In some implementations, the application server is further configured to receive, from a computing device of the plurality of computing devices, a request to terminate use of the resource. In some implementations, the application server is further configured to determine the threshold as an average time of access of the resource by each of the plurality of computing devices. In a further implementation, the application server is further configured to adjust, for each of the plurality of computing devices, a time of access of the resource by a predetermined coefficient corresponding to a role of a user of the corresponding computing device.

In some implementations, the application server is further configured to receive a plurality of responses to the generated survey from each of the plurality of computing devices other than the second computing device; and aggregate the plurality of responses. In a further implementation, the application server is further configured to transmit the aggregated plurality of responses to the second computing device. In another further implementation, the application server is further configured to generate an aggregated score from a plurality of scores of the corresponding plurality of responses.

In still another aspect, the present disclosure is directed to a method for tracking user engagement. The method includes identifying, by a computing device, a plurality of network connections of the computing device during a predetermined time period. The method also includes, for each of the plurality of network connections: determining, by the computing device, a location corresponding to the network connection; identifying, by the computing device, a first subset of the plurality of network connections corresponding to a predetermined location; calculating, by the computing device, a ratio of the first subset of the plurality of network connections to a total number of the plurality of network connections during the predetermined time period; determining, by the computing device, that the ratio exceeds a threshold; and responsive to the determination that the ratio exceeds the threshold, transmitting, by the device, a notification to a second computing device.

In some implementations, the method includes generating, by the computing device, a heatmap identifying an amount of time spent at each determined location. In some implementations, the method includes receiving, from the second computing device, the threshold as an average of ratios of network connections corresponding to the predetermined location to total network connections received from each of a plurality of computing devices. In some implementations, the method includes determining that a broadcast identifier of a wireless access point of the network connection matches a predetermined identifier.

BRIEF DESCRIPTION OF THE DRAWING FIGURES

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating embodiments, principles and concepts. The drawings are not intended to limit the scope of the claims included herewith.

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein;

Section B describes embodiments of systems and methods for delivering a computing environment to a remote user;

Section C describes embodiments of systems and methods for virtualizing an application delivery controller;

Section D describes embodiments of systems and methods for providing a clustered appliance architecture environment; and Section E describes systems and methods for enhancing employee engagement using intelligent workspaces.

A. Network and Computing Environment

Figure 1A:
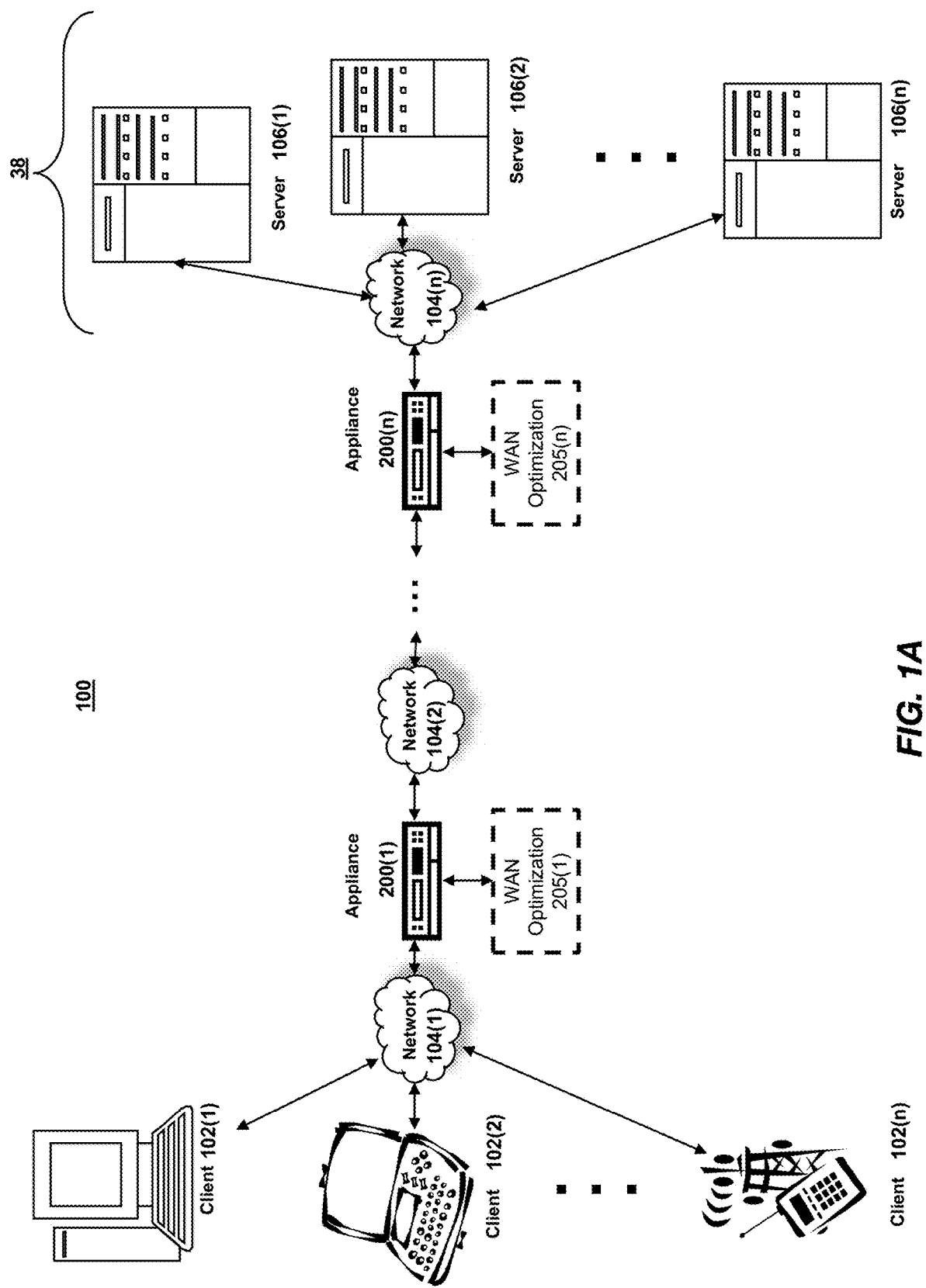
FIG. 1A is a block diagram of a network computing system, in accordance with an illustrative embodiment.

Referring to FIG. 1A, an illustrative network environment 100 is depicted. Network environment 100 may include one or more clients 102(1)-102(n) (also generally referred to as local machine(s) 102 or client(s) 102) in communication with one or more servers 106(1)-106(n) (also generally referred to as remote machine(s) 106 or server(s) 106) via one or more networks 104(1)-104n (generally referred to as network(s) 104). In some embodiments, a client 102 may communicate with a server 106 via one or more appliances 200(1)-200n (generally referred to as appliance(s) 200 or gateway(s) 200).

Although the embodiment shown in FIG. 1A shows one or more networks 104 between clients 102 and servers 106, in other embodiments, clients 102 and servers 106 may be on the same network 104. The various networks 104 may be the same type of network or different types of networks. For example, in some embodiments, network 104(1) may be a private network such as a local area network (LAN) or a company Intranet, while network 104(2) and/or network 104(n) may be a public network, such as a wide area network (WAN) or the Internet. In other embodiments, both network 104(1) and network 104(n) may be private networks. Networks 104 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols.

As shown in FIG. 1A, one or more appliances 200 may be located at various points or in various communication paths of network environment 100. For example, appliance 200 may be deployed between two networks 104(1) and 104(2), and appliances 200 may communicate with one another to work in conjunction to, for example, accelerate network traffic between clients 102 and servers 106. In other embodiments, the appliance 200 may be located on a network 104. For example, appliance 200 may be implemented as part of one of clients 102 and/or servers 106. In an embodiment, appliance 200 may be implemented as a network device such as Citrix networking (formerly NetScaler®) products sold by Citrix Systems, Inc. of Fort Lauderdale, Fla.

As shown in FIG. 1A, one or more servers 106 may operate as a server farm 38. Servers 106 of server farm 38 may be logically grouped, and may either be geographically co-located (e.g., on premises) or geographically dispersed (e.g., cloud based) from clients 102 and/or other servers 106. In an embodiment, server farm 38 executes one or more applications on behalf of one or more of clients 102 (e.g., as an application server), although other uses are possible, such as a file server, gateway server, proxy server, or other similar server uses. Clients 102 may seek access to hosted applications on servers 106.

As shown in FIG. 1A, in some embodiments, appliances 200 may include, be replaced by, or be in communication with, one or more additional appliances, such as WAN optimization appliances 205(1)-205(n), referred to generally as WAN optimization appliance(s) 205. For example, WAN optimization appliance 205 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, appliance 205 may be a performance enhancing proxy or a WAN optimization controller. In one embodiment, appliance 205 may be implemented as Citrix SD-WAN products sold by Citrix Systems, Inc. of Fort Lauderdale, Fla.

Figure 1B:
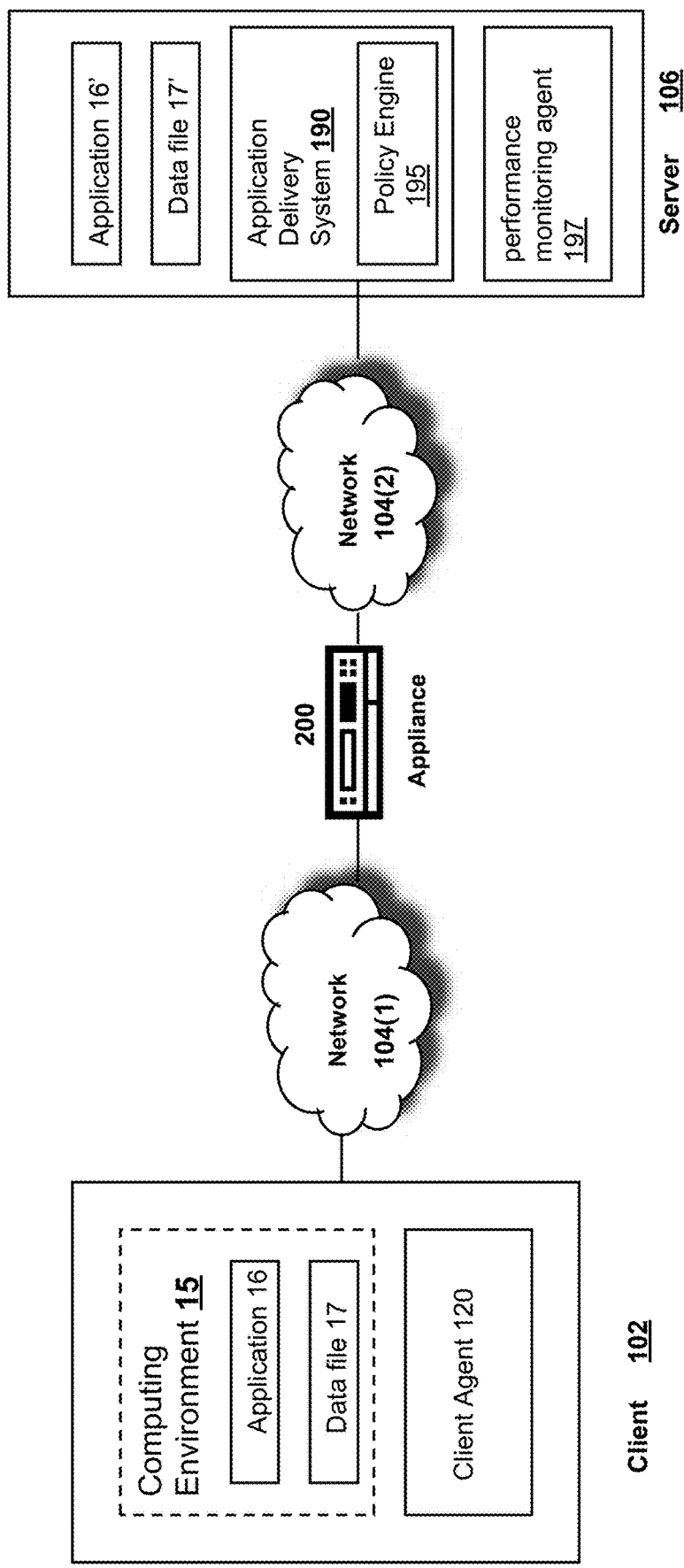
FIG. 1B is a block diagram of a network computing system for delivering a computing environment from a server to a client via an appliance, in accordance with an illustrative embodiment.

Referring to FIG. 1B, an example network environment, 100', for delivering and/or operating a computing network environment on a client 102 is shown. As shown in FIG. 1B, a server 106 may include an application delivery system 190 for delivering a computing environment, application, and/or data files to one or more clients 102. Client 102 may include client agent 120 and computing environment 15. Computing environment 15 may execute or operate an application, 16, that accesses, processes or uses a data file 17. Computing environment 15, application 16 and/or data file 17 may be delivered via appliance 200 and/or the server 106.

Appliance 200 may accelerate delivery of all or a portion of computing environment 15 to a client 102, for example by the application delivery system 190. For example, appliance 200 may accelerate delivery of a streaming application and data file processable by the application from a data center to a remote user location by accelerating transport layer traffic between a client 102 and a server 106. Such acceleration may be provided by one or more techniques, such as: 1) transport layer connection pooling, 2) transport layer connection multiplexing, 3) transport control protocol buffering, 4) compression, 5) caching, or other techniques. Appliance 200 may also provide load balancing of servers 106 to process requests from clients 102, act as a proxy or access server to provide access to the one or more servers 106, provide security and/or act as a firewall between a client 102 and a server 106, provide Domain Name Service (DNS) resolution, provide one or more virtual servers or virtual internet protocol servers, and/or provide a secure virtual private network (VPN) connection from a client 102 to a server 106, such as a secure socket layer (SSL) VPN connection and/or provide encryption and decryption operations.

Application delivery management system 190 may deliver computing environment 15 to a user (e.g., client 102), remote or otherwise, based on authentication and authorization policies applied by policy engine 195. A remote user may obtain a computing environment and access to server stored applications and data files from any network-connected device (e.g., client 102). For example, appliance 200 may request an application and data file from server 106. In response to the request, application delivery system 190 and/or server 106 may deliver the application and data file to client 102, for example via an application stream to operate in computing environment 15 on client 102, or via a remote-display protocol or otherwise via remote-based or server-based computing. In an embodiment, application delivery system 190 may be implemented as any portion of the Citrix Workspace Suite™ by Citrix Systems, Inc., such as Citrix Virtual Apps and Desktops (formerly XenApp® and XenDesktop®).

Policy engine 195 may control and manage the access to, and execution and delivery of, applications. For example, policy engine 195 may determine the one or more applications a user or client 102 may access and/or how the application should be delivered to the user or client 102, such as a server-based computing, streaming or delivering the application locally to the client 120 for local execution.

For example, in operation, a client 102 may request execution of an application (e.g., application 16') and application delivery system 190 of server 106 determines how to execute application 16', for example based upon credentials received from client 102 and a user policy applied by policy engine 195 associated with the credentials. For example, application delivery system 190 may enable client 102 to receive application-output data generated by execution of the application on a server 106, may enable client 102 to execute the application locally after receiving the application from server 106, or may stream the application via network 104 to client 102. For example, in some embodiments, the application may be a server-based or a remote-based application executed on server 106 on behalf of client 102. Server 106 may display output to client 102 using a thin-client or remote-display protocol, such as the Independent Computing Architecture (ICA) protocol by Citrix Systems, Inc. of Fort Lauderdale, Fla. The application may be any application related to real-time data communications, such as applications for streaming graphics, streaming video and/or audio or other data, delivery of remote desktops or workspaces or hosted services or applications, for example infrastructure as a service (IaaS), desktop as a service (DaaS), workspace as a service (WaaS), software as a service (SaaS) or platform as a service (PaaS).

One or more of servers 106 may include a performance monitoring service or agent 197. In some embodiments, a dedicated one or more servers 106 may be employed to perform performance monitoring. Performance monitoring may be performed using data collection, aggregation, analysis, management and reporting, for example by software, hardware or a combination thereof. Performance monitoring may include one or more agents for performing monitoring, measurement and data collection activities on clients 102 (e.g., client agent 120), servers 106 (e.g., agent 197) or an appliance 200 and/or 205 (agent not shown). In general, monitoring agents (e.g., 120 and/or 197) execute transparently (e.g., in the background) to any application and/or user of the device. In some embodiments, monitoring agent 197 includes any of the product embodiments referred to as Citrix Analytics or Citrix Application Delivery Management by Citrix Systems, Inc. of Fort Lauderdale, Fla.

The monitoring agents 120 and 197 may monitor, measure, collect, and/or analyze data on a predetermined frequency, based upon an occurrence of given event(s), or in real time during operation of network environment 100. The monitoring agents may monitor resource consumption and/or performance of hardware, software, and/or communications resources of clients 102, networks 104, appliances 200 and/or 205, and/or servers 106. For example, network connections such as a transport layer connection, network latency, bandwidth utilization, end-user response times, application usage and performance, session connections to an application, cache usage, memory usage, processor usage, storage usage, database transactions, client and/or server utilization, active users, duration of user activity, application crashes, errors, or hangs, the time required to log-in to an application, a server, or the application delivery system, and/or other performance conditions and metrics may be monitored.

The monitoring agents 120 and 197 may provide application performance management for application delivery system 190. For example, based upon one or more monitored performance conditions or metrics, application delivery system 190 may be dynamically adjusted, for example periodically or in real-time, to optimize application delivery by servers 106 to clients 102 based upon network environment performance and conditions.

In described embodiments, clients 102, servers 106, and appliances 200 and 205 may be deployed as and/or executed on any type and form of computing device, such as any desktop computer, laptop computer, or mobile device capable of communication over at least one network and performing the operations described herein. For example, clients 102, servers 106 and/or appliances 200 and 205 may each correspond to one computer, a plurality of computers, or a network of distributed computers such as computer 101 shown in FIG. 1C.

Figure 1C:
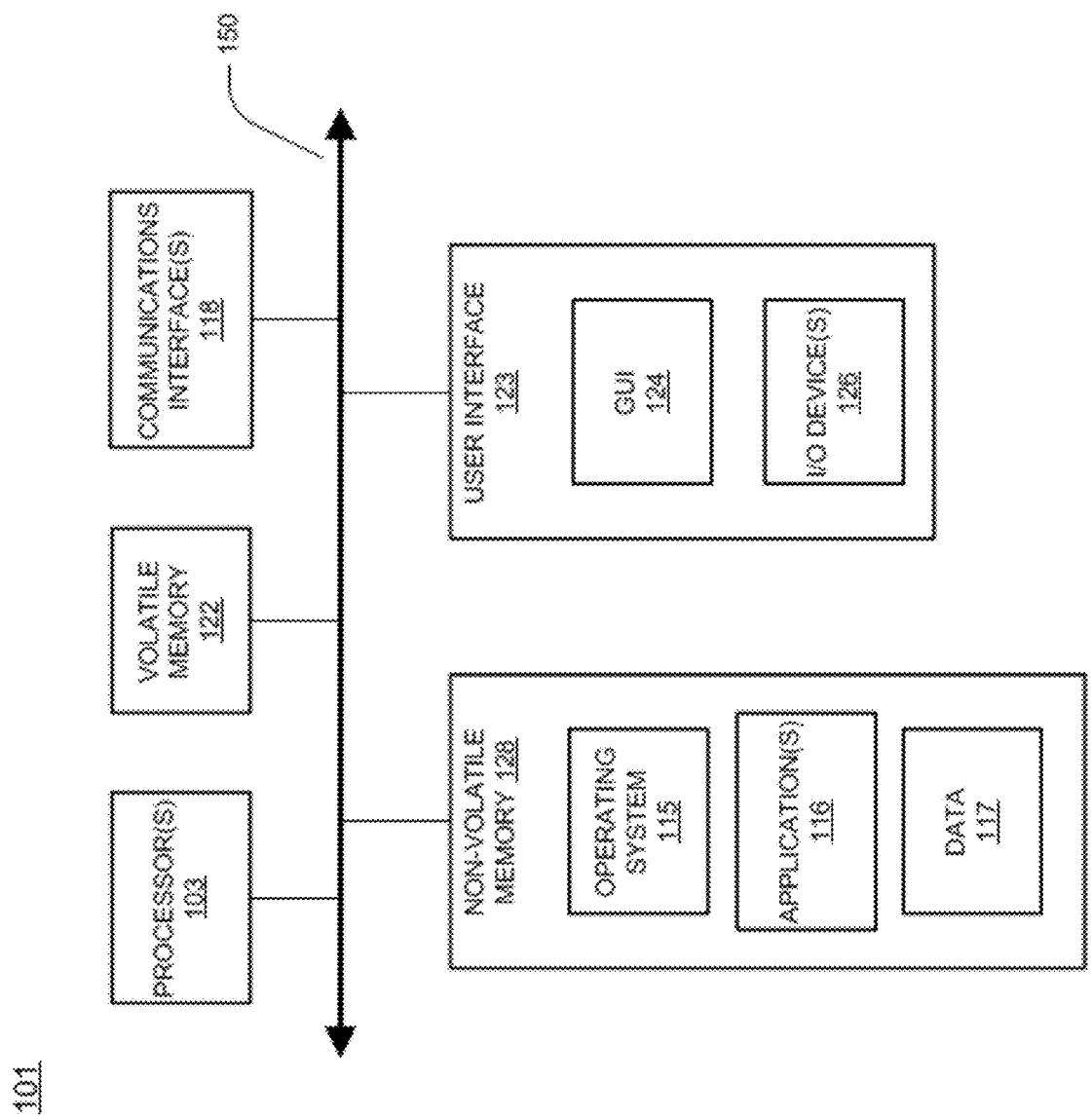
FIG. 1C is a block diagram of a computing device, in accordance with an illustrative embodiment.

As shown in FIG. 1C, computer 101 may include one or more processors 103, volatile memory 122 (e.g., RAM), non-volatile memory 128 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 123, one or more communications interfaces 118, and communication bus 150. User interface 123 may include graphical user interface (GUI) 124 (e.g., a touchscreen, a display, etc.) and one or more input/output (I/O) devices 126 (e.g., a mouse, a keyboard, etc.). Non-volatile memory 128 stores operating system 115, one or more applications 116, and data 117 such that, for example, computer instructions of operating system 115 and/or applications 116 are executed by processor(s) 103 out of volatile memory 122. Data may be entered using an input device of GUI 124 or received from I/O device(s) 126. Various elements of computer 101 may communicate via communication bus 150. Computer 101 as shown in FIG. 1C is shown merely as an example, as clients 102, servers 106 and/or appliances 200 and 205 may be implemented by any computing or processing environment and with any type of machine or set of machines that may have suitable hardware and/or software capable of operating as described herein.

Processor(s) 103 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

Communications interfaces 118 may include one or more interfaces to enable computer 101 to access a computer network such as a LAN, a WAN, or the Internet through a variety of wired and/or wireless or cellular connections.

In described embodiments, a first computing device 101 may execute an application on behalf of a user of a client computing device (e.g., a client 102), may execute a virtual machine, which provides an execution session within which applications execute on behalf of a user or a client computing device (e.g., a client 102), such as a hosted desktop session, may execute a terminal services session to provide a hosted desktop environment, or may provide access to a computing environment including one or more of: one or more applications, one or more desktop applications, and one or more desktop sessions in which one or more applications may execute.

Additional details of the implementation and operation of network environment 100, clients 102, servers 106, and appliances 200 and 205 may be as described in U.S. Pat. No. 9,538,345, issued Jan. 3, 2017 to Citrix Systems, Inc. of Fort Lauderdale, Fla., the teachings of which are hereby incorporated herein by reference.

B. Appliance Architecture

Figure 2:
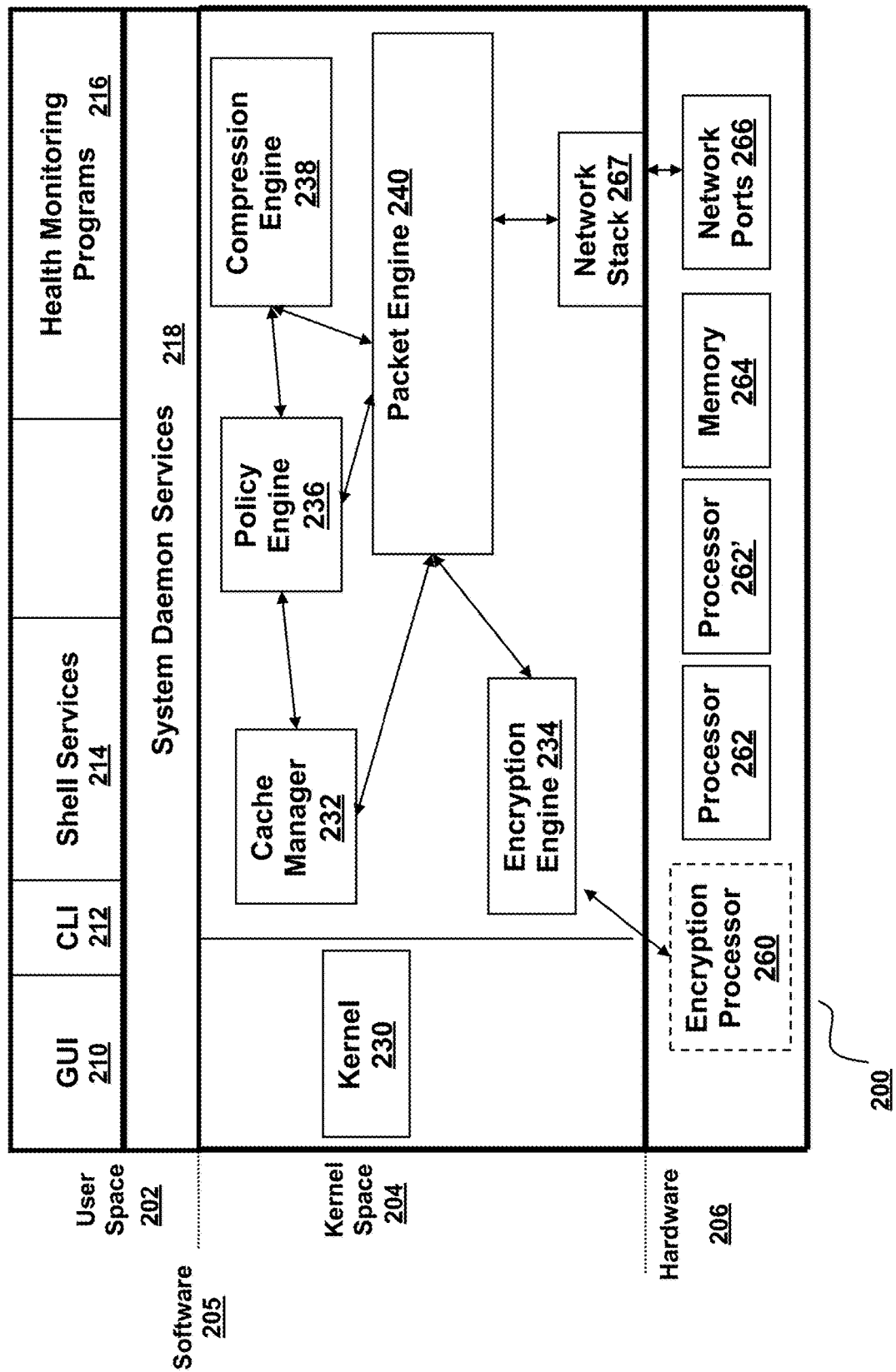
FIG. 2 is a block diagram of an appliance for processing communications between a client and a server, in accordance with an illustrative embodiment.

FIG. 2 shows an example embodiment of appliance 200. As described herein, appliance 200 may be implemented as a server, gateway, router, switch, bridge or other type of computing or network device. As shown in FIG. 2, an embodiment of appliance 200 may include a hardware layer 206 and a software layer 205 divided into a user space 202 and a kernel space 204. Hardware layer 206 provides the hardware elements upon which programs and services within kernel space 204 and user space 202 are executed and allow programs and services within kernel space 204 and user space 202 to communicate data both internally and externally with respect to appliance 200. As shown in FIG. 2, hardware layer 206 may include one or more processing units 262 for executing software programs and services, memory 264 for storing software and data, network ports 266 for transmitting and receiving data over a network, and encryption processor 260 for encrypting and decrypting data such as in relation to Secure Socket Layer (SSL) or Transport Layer Security (TLS) processing of data transmitted and received over the network.

An operating system of appliance 200 allocates, manages, or otherwise segregates the available system memory into kernel space 204 and user space 202. Kernel space 204 is reserved for running kernel 230, including any device drivers, kernel extensions or other kernel related software. As known to those skilled in the art, kernel 230 is the core of the operating system, and provides access, control, and management of resources and hardware-related elements of application 104. Kernel space 204 may also include a number of network services or processes working in conjunction with cache manager 232.

Appliance 200 may include one or more network stacks 267, such as a TCP/IP based stack, for communicating with client(s) 102, server(s) 106, network(s) 104, and/or other appliances 200 or 205. For example, appliance 200 may establish and/or terminate one or more transport layer connections between clients 102 and servers 106. Each network stack 267 may include a buffer 243 for queuing one or more network packets for transmission by appliance 200.

Kernel space 204 may include cache manager 232, packet engine 240, encryption engine 234, policy engine 236 and compression engine 238. In other words, one or more of processes 232, 240, 234, 236 and 238 run in the core address space of the operating system of appliance 200, which may reduce the number of data transactions to and from the memory and/or context switches between kernel mode and user mode, for example since data obtained in kernel mode may not need to be passed or copied to a user process, thread or user level data structure.

Cache manager 232 may duplicate original data stored elsewhere or data previously computed, generated or transmitted to reducing the access time of the data. In some embodiments, the cache memory may be a data object in memory 264 of appliance 200, or may be a physical memory having a faster access time than memory 264.

Policy engine 236 may include a statistical engine or other configuration mechanism to allow a user to identify, specify, define or configure a caching policy and access, control and management of objects, data or content being cached by appliance 200, and define or configure security, network traffic, network access, compression or other functions performed by appliance 200.

Encryption engine 234 may process any security related protocol, such as SSL or TLS. For example, encryption engine 234 may encrypt and decrypt network packets, or any portion thereof, communicated via appliance 200, may setup or establish SSL, TLS or other secure connections, for example between client 102, server 106, and/or other appliances 200 or 205. In some embodiments, encryption engine 234 may use a tunneling protocol to provide a VPN between a client 102 and a server 106. In some embodiments, encryption engine 234 is in communication with encryption processor 260. Compression engine 238 compresses network packets bi-directionally between clients 102 and servers 106 and/or between one or more appliances 200.

Packet engine 240 may manage kernel-level processing of packets received and transmitted by appliance 200 via network stacks 267 to send and receive network packets via network ports 266. Packet engine 240 may operate in conjunction with encryption engine 234, cache manager 232, policy engine 236 and compression engine 238, for example to perform encryption/decryption, traffic management such as request-level content switching and request-level cache redirection, and compression and decompression of data.

User space 202 is a memory area or portion of the operating system used by user mode applications or programs otherwise running in user mode. A user mode application may not access kernel space 204 directly and uses service calls in order to access kernel services. User space 202 may include graphical user interface (GUI) 210, a command line interface (CLI) 212, shell services 214, health monitor 216, and daemon services 218. GUI 210 and CLI 212 enable a system administrator or other user to interact with and control the operation of appliance 200, such as via the operating system of appliance 200. Shell services 214 include the programs, services, tasks, processes or executable instructions to support interaction with appliance 200 by a user via the GUI 210 and/or CLI 212.

Health monitor 216 monitors, checks, reports and ensures that network systems are functioning properly and that users are receiving requested content over a network, for example by monitoring activity of appliance 200. In some embodiments, health monitor 216 intercepts and inspects any network traffic passed via appliance 200. For example, health monitor 216 may interface with one or more of encryption engine 234, cache manager 232, policy engine 236, compression engine 238, packet engine 240, daemon services 218, and shell services 214 to determine a state, status, operating condition, or health of any portion of the appliance 200. Further, health monitor 216 may determine if a program, process, service or task is active and currently running, check status, error or history logs provided by any program, process, service or task to determine any condition, status or error with any portion of appliance 200. Additionally, health monitor 216 may measure and monitor the performance of any application, program, process, service, task or thread executing on appliance 200.

Daemon services 218 are programs that run continuously or in the background and handle periodic service requests received by appliance 200. In some embodiments, a daemon service may forward the requests to other programs or processes, such as another daemon service 218 as appropriate.

As described herein, appliance 200 may relieve servers 106 of much of the processing load caused by repeatedly opening and closing transport layer connections to clients 102 by opening one or more transport layer connections with each server 106 and maintaining these connections to allow repeated data accesses by clients via the Internet (e.g., "connection pooling"). To perform connection pooling, appliance 200 may translate or multiplex communications by modifying sequence numbers and acknowledgment numbers at the transport layer protocol level (e.g., "connection multiplexing"). Appliance 200 may also provide switching or load balancing for communications between the client 102 and server 106.

As described herein, each client 102 may include client agent 120 for establishing and exchanging communications with appliance 200 and/or server 106 via a network 104. Client 102 may have installed and/or execute one or more applications that are in communication with network 104. Client agent 120 may intercept network communications from a network stack used by the one or more applications. For example, client agent 120 may intercept a network communication at any point in a network stack and redirect the network communication to a destination desired, managed or controlled by client agent 120, for example to intercept and redirect a transport layer connection to an IP address and port controlled or managed by client agent 120. Thus, client agent 120 may transparently intercept any protocol layer below the transport layer, such as the network layer, and any protocol layer above the transport layer, such as the session, presentation or application layers. Client agent 120 can interface with the transport layer to secure, optimize, accelerate, route or load-balance any communications provided via any protocol carried by the transport layer.

In some embodiments, client agent 120 is implemented as an Independent Computing Architecture (ICA) client developed by Citrix Systems, Inc. of Fort Lauderdale, Fla. Client agent 120 may perform acceleration, streaming, monitoring, and/or other operations. For example, client agent 120 may accelerate streaming an application from a server 106 to a client 102. Client agent 120 may also perform end-point detection/scanning and collect end-point information about client 102 for appliance 200 and/or server 106. Appliance 200 and/or server 106 may use the collected information to determine and provide access, authentication and authorization control of the client's connection to network 104. For example, client agent 120 may identify and determine one or more client-side attributes, such as: the operating system and/or a version of an operating system, a service pack of the operating system, a running service, a running process, a file, presence or versions of various applications of the client, such as antivirus, firewall, security, and/or other software.

Additional details of the implementation and operation of appliance 200 may be as described in U.S. Pat. No. 9,538,345, issued Jan. 3, 2017 to Citrix Systems, Inc. of Fort Lauderdale, Fla., the teachings of which are hereby incorporated herein by reference.

C. Systems and Methods for Providing Virtualized Application Delivery Controller Referring now to FIG. 3, a block diagram of a virtualized environment 300 is shown. As shown, a computing device 302 in virtualized environment 300 includes a virtualization layer 303, a hypervisor layer 304, and a hardware layer 307. Hypervisor layer 304 includes one or more hypervisors (or virtualization managers) 301 that allocates and manages access to a number of physical resources in hardware layer 307 (e.g., physical processor(s) 321 and physical disk(s) 328) by at least one virtual machine (VM) (e.g., one of VMs 306) executing in virtualization layer 303. Each VM 306 may include allocated virtual resources such as virtual processors 332 and/or virtual disks 342, as well as virtual resources such as virtual memory and virtual network interfaces. In some embodiments, at least one of VMs 306 may include a control operating system (e.g., 305) in communication with hypervisor 301 and used to execute applications for managing and configuring other VMs (e.g., guest operating systems 310) on device 302.

In general, hypervisor(s) 301 may provide virtual resources to an operating system of VMs 306 in any manner that simulates the operating system having access to a physical device. Thus, hypervisor(s) 301 may be used to emulate virtual hardware, partition physical hardware, virtualize physical hardware, and execute virtual machines that provide access to computing environments. In an illustrative embodiment, hypervisor(s) 301 may be implemented as a Citrix Hypervisor by Citrix Systems, Inc. of Fort Lauderdale, Fla. In an illustrative embodiment, device 302 executing a hypervisor that creates a virtual machine platform on which guest operating systems may execute is referred to as a host server. 302

Hypervisor 301 may create one or more VMs 306 in which an operating system (e.g., control operating system 305 and/or guest operating system 310) executes. For example, the hypervisor 301 loads a virtual machine image to create VMs 306 to execute an operating system. Hypervisor 301 may present VMs 306 with an abstraction of hardware layer 307, and/or may control how physical capabilities of hardware layer 307 are presented to VMs 306. For example, hypervisor(s) 301 may manage a pool of resources distributed across multiple physical computing devices.

In some embodiments, one of VMs 306 (e.g., the VM executing control operating system 305) may manage and configure other of VMs 306, for example by managing the execution and/or termination of a VM and/or managing allocation of virtual resources to a VM. In various embodiments, VMs may communicate with hypervisor(s) 301 and/or other VMs via, for example, one or more Application Programming Interfaces (APIs), shared memory, and/or other techniques.

In general, VMs 306 may provide a user of device 302 with access to resources within virtualized computing environment 300, for example, one or more programs, applications, documents, files, desktop and/or computing environments, or other resources. In some embodiments, VMs 306 may be implemented as fully virtualized VMs that are not aware that they are virtual machines (e.g., a Hardware Virtual Machine or HVM). In other embodiments, the VM may be aware that it is a virtual machine, and/or the VM may be implemented as a paravirtualized (PV) VM.

Figure 3:
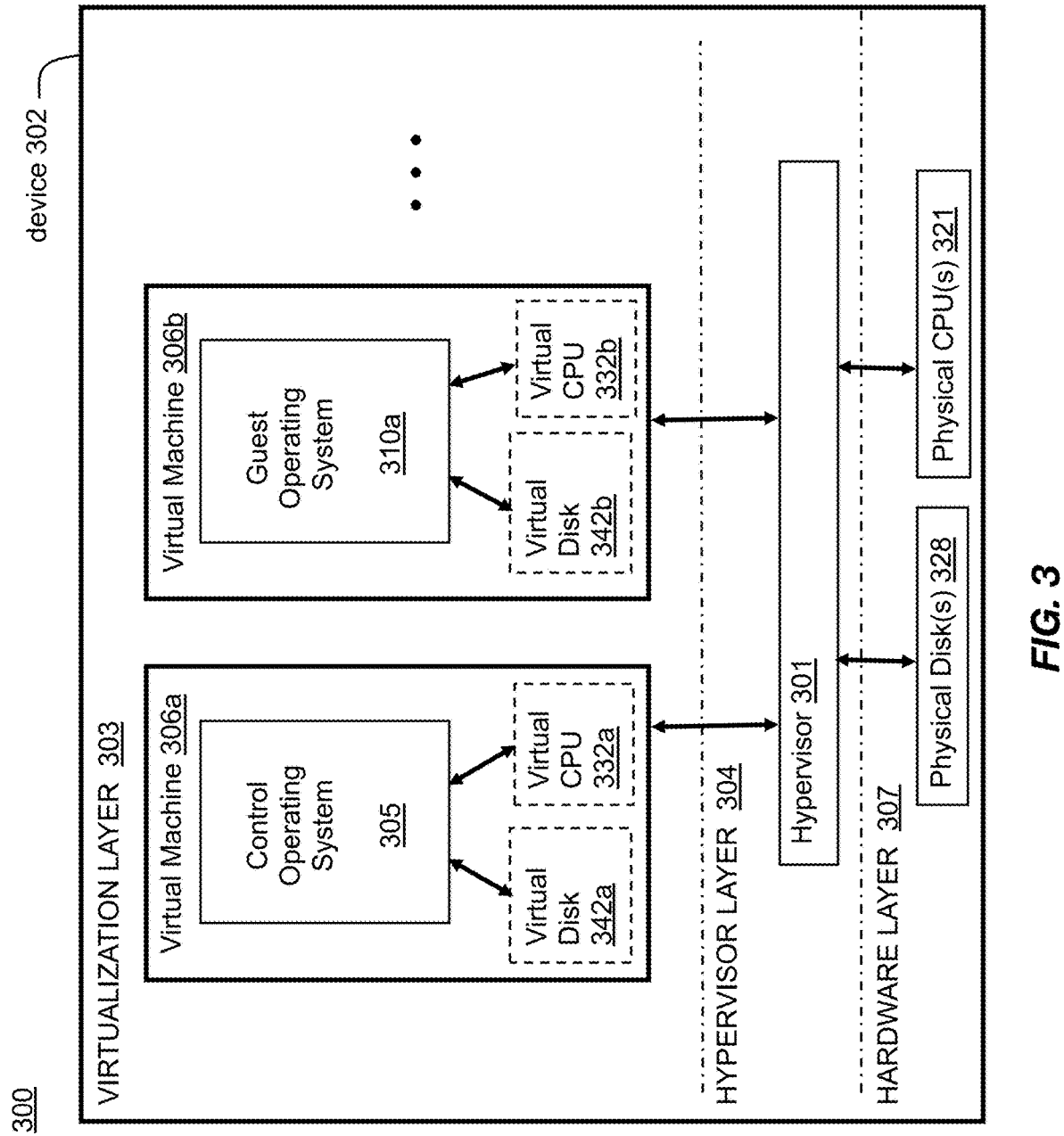
FIG. 3 is a block diagram of a virtualization environment, in accordance with an illustrative embodiment.

Although shown in FIG. 3 as including a single virtualized device 302, virtualized environment 300 may include a plurality of networked devices in a system in which at least one physical host executes a virtual machine. A device on which a VM executes may be referred to as a physical host and/or a host machine. For example, appliance 200 may be additionally or alternatively implemented in a virtualized environment 300 on any computing device, such as a client 102, server 106 or appliance 200. Virtual appliances may provide functionality for availability, performance, health monitoring, caching and compression, connection multiplexing and pooling and/or security processing (e.g., firewall, VPN, encryption/decryption, etc.), similarly as described in regard to appliance 200.

Additional details of the implementation and operation of virtualized computing environment 300 may be as described in U.S. Pat. No. 9,538,345, issued Jan. 3, 2017 to Citrix Systems, Inc. of Fort Lauderdale, Fla., the teachings of which are hereby incorporated herein by reference.

In some embodiments, a server may execute multiple virtual machines 306, for example on various cores of a multi-core processing system and/or various processors of a multiple processor device. For example, although generally shown herein as "processors" (e.g., in FIGS. 1C, 2 and 3), one or more of the processors may be implemented as either single- or multi-core processors to provide a multi-threaded, parallel architecture and/or multi-core architecture. Each processor and/or core may have or use memory that is allocated or assigned for private or local use that is only accessible by that processor/core, and/or may have or use memory that is public or shared and accessible by multiple processors/cores. Such architectures may allow work, task, load or network traffic distribution across one or more processors and/or one or more cores (e.g., by functional parallelism, data parallelism, flow-based data parallelism, etc.).

Further, instead of (or in addition to) the functionality of the cores being implemented in the form of a physical processor/core, such functionality may be implemented in a virtualized environment (e.g., 300) on a client 102, server 106 or appliance 200, such that the functionality may be implemented across multiple devices, such as a cluster of computing devices, a server farm or network of computing devices, etc. The various processors/cores may interface or communicate with each other using a variety of interface techniques, such as core to core messaging, shared memory, kernel APIs, etc.

In embodiments employing multiple processors and/or multiple processor cores, described embodiments may distribute data packets among cores or processors, for example to balance the flows across the cores. For example, packet distribution may be based upon determinations of functions performed by each core, source and destination addresses, and/or whether: a load on the associated core is above a predetermined threshold; the load on the associated core is below a predetermined threshold; the load on the associated core is less than the load on the other cores; or any other metric that can be used to determine where to forward data packets based in part on the amount of load on a processor.

For example, data packets may be distributed among cores or processes using receive-side scaling (RSS) in order to process packets using multiple processors/cores in a network. RSS generally allows packet processing to be balanced across multiple processors/cores while maintaining in-order delivery of the packets. In some embodiments, RSS may use a hashing scheme to determine a core or processor for processing a packet.

The RSS may generate hashes from any type and form of input, such as a sequence of values. This sequence of values can include any portion of the network packet, such as any header, field or payload of network packet, and include any tuples of information associated with a network packet or data flow, such as addresses and ports. The hash result or any portion thereof may be used to identify a processor, core, engine, etc., for distributing a network packet, for example via a hash table, indirection table, or other mapping technique.

Additional details of the implementation and operation of a multi-processor and/or multi-core system may be as described in U.S. Pat. No. 9,538,345, issued Jan. 3, 2017 to Citrix Systems, Inc. of Fort Lauderdale, Fla., the teachings of which are hereby incorporated herein by reference.

D. Systems and Methods for Providing a Distributed Cluster Architecture

Figure 4:
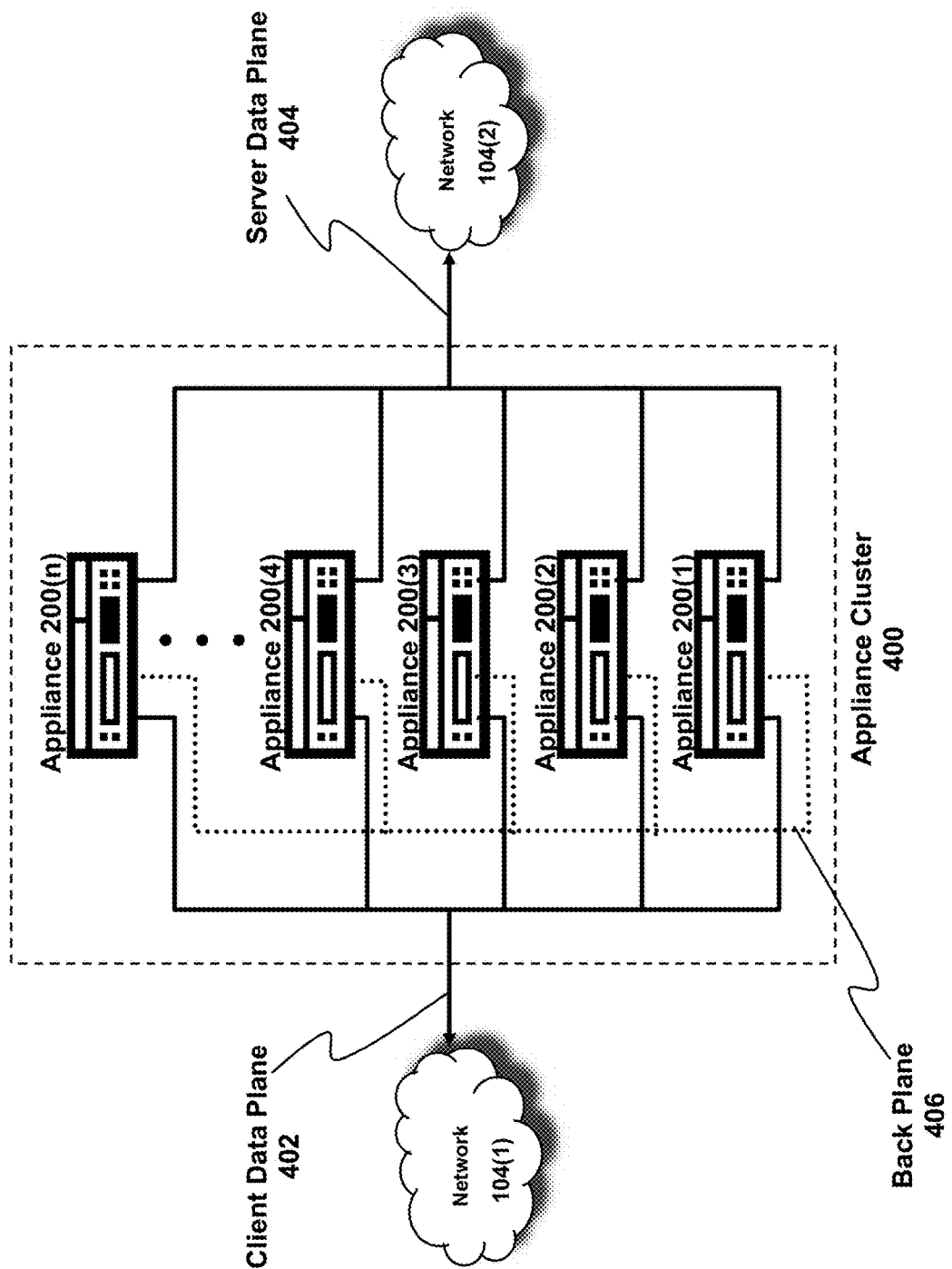
FIG. 4 is a block diagram of a cluster system, in accordance with an illustrative embodiment.

Although shown in FIGS. 1A and 1B as being single appliances, appliances 200 may be implemented as one or more distributed or clustered appliances. Individual computing devices or appliances may be referred to as nodes of the cluster. A centralized management system may perform load balancing, distribution, configuration, or other tasks to allow the nodes to operate in conjunction as a single computing system. Such a cluster may be viewed as a single virtual appliance or computing device. FIG. 4 shows a block diagram of an illustrative computing device cluster or appliance cluster 400. A plurality of appliances 200 or other computing devices (e.g., nodes) may be joined into a single cluster 400. Cluster 400 may operate as an application server, network storage server, backup service, or any other type of computing device to perform many of the functions of appliances 200 and/or 205.

In some embodiments, each appliance 200 of cluster 400 may be implemented as a multi-processor and/or multi-core appliance, as described herein. Such embodiments may employ a two-tier distribution system, with one appliance if the cluster distributing packets to nodes of the cluster, and each node distributing packets for processing to processors/cores of the node. In many embodiments, one or more of appliances 200 of cluster 400 may be physically grouped or geographically proximate to one another, such as a group of blade servers or rack mount devices in a given chassis, rack, and/or data center. In some embodiments, one or more of appliances 200 of cluster 400 may be geographically distributed, with appliances 200 not physically or geographically co-located. In such embodiments, geographically remote appliances may be joined by a dedicated network connection and/or VPN. In geographically distributed embodiments, load balancing may also account for communications latency between geographically remote appliances.

In some embodiments, cluster 400 may be considered a virtual appliance, grouped via common configuration, management, and purpose, rather than as a physical group. For example, an appliance cluster may comprise a plurality of virtual machines or processes executed by one or more servers.

As shown in FIG. 4, appliance cluster 400 may be coupled to a first network 104(1) via client data plane 402, for example to transfer data between clients 102 and appliance cluster 400. Client data plane 402 may be implemented a switch, hub, router, or other similar network device internal or external to cluster 400 to distribute traffic across the nodes of cluster 400. For example, traffic distribution may be performed based on equal-cost multi-path (ECMP) routing with next hops configured with appliances or nodes of the cluster, open-shortest path first (OSPF), stateless hash-based traffic distribution, link aggregation (LAG) protocols, or any other type and form of flow distribution, load balancing, and routing.

Appliance cluster 400 may be coupled to a second network 104(2) via server data plane 404. Similarly to client data plane 402, server data plane 404 may be implemented as a switch, hub, router, or other network device that may be internal or external to cluster 400. In some embodiments, client data plane 402 and server data plane 404 may be merged or combined into a single device.

In some embodiments, each appliance 200 of cluster 400 may be connected via an internal communication network or back plane 406. Back plane 406 may enable inter-node or inter-appliance control and configuration messages, for inter-node forwarding of traffic, and/or for communicating configuration and control traffic from an administrator or user to cluster 400. In some embodiments, back plane 406 may be a physical network, a VPN or tunnel, or a combination thereof.

Additional details of cluster 400 may be as described in U.S. Pat. No. 9,538,345, issued Jan. 3, 2017 to Citrix Systems, Inc. of Fort Lauderdale, Fla., the teachings of which are hereby incorporated herein by reference.

E. Systems and Methods to Enhance Employee Engagement using Intelligent Workspaces Traditional methods of measuring employee or user engagement include conducting periodic surveys, but these surveys may be time-consuming, with many questions to fill out, leading to user frustration. Users may also decline to complete the surveys, resulting in low participation and lower accuracy overall with regard to estimations of engagement for the population. Spacing out the surveys over long periodic intervals attempts to address this frustration, but may similarly result in lower accuracy if users cannot remember incidents from early in the time period. Spacing out surveys may also fail to accurately capture dynamically changing perceptions about the environment or workspace. Long surveys may also take a relatively long time to analyze, resulting in delays before addressing any issues raised in the survey results.

Many enterprises are beginning to use intelligent workspaces for productivity for employees and users, including virtual or hosted desktops or SaaS applications provided by application servers. These workspaces allow greater access to user activities through unification of different applications within the hosted environment. In some implementations, employees practically 'live' their work-lives inside the workspace, with all or nearly all enterprise-related application and document access performed via the workspace. The workspace can thus provide access to previously unavailable metrics, allowing for data gathering regarding user engagement without requiring time-consuming surveys; as well as providing opportunities for short "micro" surveys dynamically generated responsive to user actions. These surveys and metrics may be aggregated and analyzed by a machine learning system of the application server or hosting provider on a real-time or near real-time basis. The machine learning system may monitor various interactions of users or employees with a virtual or hosted environment or workspace, including connections to virtual machines, remote desktop applications, SaaS applications, web applications, or other such entities, as well as environmental characteristics such as network location and/or quality.

For example, in one implementation discussed in more detail below, a system may periodically monitor networks to which a user or employee is connected. Using logs of these networks, the system may prepare a heat-map that gives insights into how often employee is connected to (and presumably at) their office and how often remotely. This ratio can give a perspective on whether an employee is able to work at a place of her choice.

In another implementation, the system may collect periodic data on how long an employee or user has been connected to the intelligent workspace or hosted applications. The resulting measurements may be compared to a threshold, such that a manager or supervisor may be automatically notified and may intervene if the user or employee has many work days above a limit. This data may be further enhanced with information regarding vacations or other leave that may not be immediately apparent from a calendar, such as time spent working remotely on vacation.

In some implementations, a system may also generate and send periodic surveys or notifications to users or employees on available products, job opportunities, speaking engagements, training, or other such features, and the user's interest may be monitored (either explicitly, via positive or negative responses to the notification, or implicitly, such as via monitoring if the user or employee subsequently performs Internet or Intranet searches for more information, if the user or employee spends more than a threshold amount of time examining the notification and/or any linked documents or websites, etc.). Training opportunities may be dynamically selected for notifications based on other resources accessed, work performed, etc. Similarly, mentoring opportunities may be selected based on analysis of an employee's role and roles of mentors.

In some implementations, the generated micro surveys may be used to enable employees to provide instant feedback or identifications of appreciation to one another. For example, the machine learning system may identify relevant participants in a project based on time involved, roles, portions accessed, etc. The system may then generate and provide micro-surveys to other employees regarding the identified project leader or important or active employee within the project.

Figure 5A:
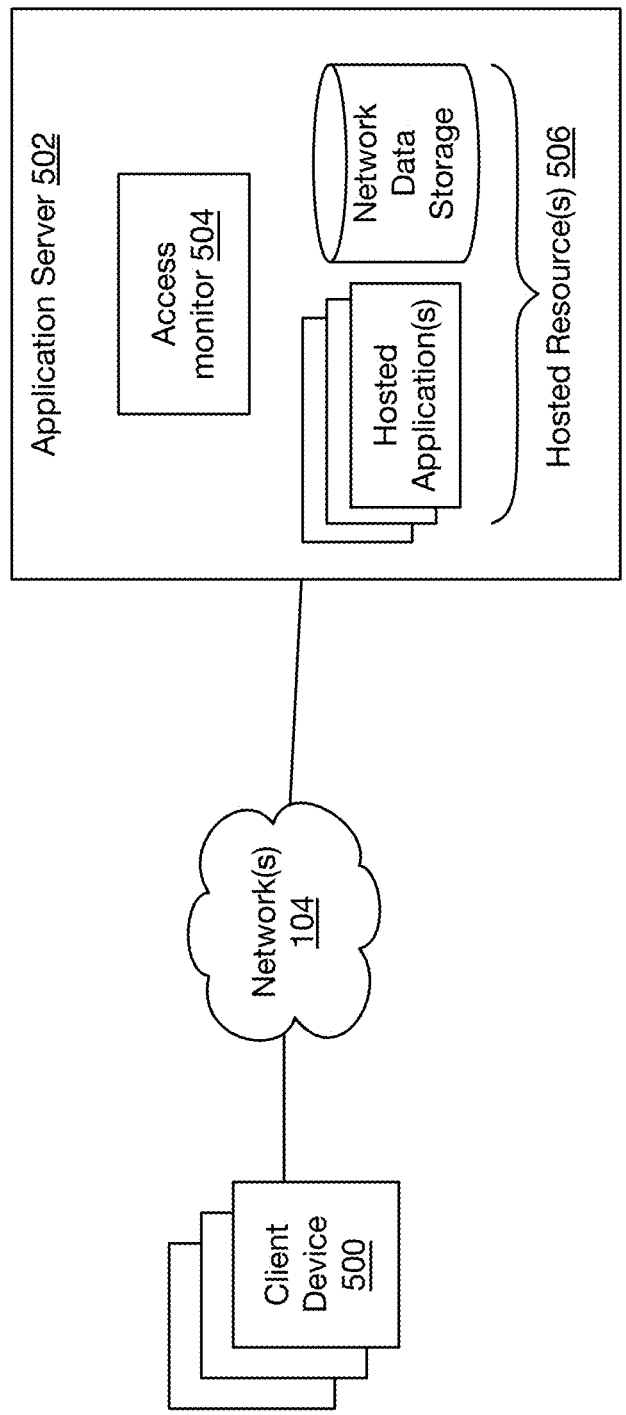
FIG. 5A is a block diagram of an implementation of a system for dynamically generating engagement surveys.

FIG. 5A is a block diagram of an implementation of a system for dynamically generating engagement surveys. A plurality of client devices 500 may connect via one or more networks 104, including Internet and/or Intranet networks, virtual private networks (VPNs), or other such networks, to one or more application servers 502. Client devices 500 may comprise laptop computers, desktop computers, tablet computers, smart phones, wearable computers, embedded computers or Internet of Things (IoT) devices or appliances, smart automobiles, or any other type and form of computing device or devices. Application server 502 may comprise a server, cloud or cluster of servers, appliances, virtual machine or machines executed by one or more computing devices, or any other type of server or servers. Application server 502 may provide one or more hosted resources 506 to client devices 500, including hosted desktops or hosted virtual machines (e.g. via a remote desktop or independent computing architecture (ICA) protocol), web applications or SaaS applications, network data storage, document management systems, enterprise resource planning (ERP) systems, or any other type and form of hosted resource.

Each of the above-mentioned elements or entities is implemented in hardware, or a combination of hardware and software, in one or more embodiments. Each component of the system 500, 502 may be implemented using hardware or a combination of hardware or software detailed above in connection with FIG. 1. For instance, each of these elements or entities can include any application, program, library, script, task, service, process or any type and form of executable instructions executing on hardware of a client device (e.g., client applications, hosted resources, etc.). The hardware includes circuitry such as one or more processors in one or more embodiments.

In some implementations, the application server or servers 502 may comprise an access monitor 504. Access monitor 504 may comprise an application, service, server, daemon, routine, or other executable logic for monitoring access of a device 500 and/or a user of a device to one or more hosted resources 506. Access monitor 504 may monitor how long a resource is accessed, by which user and/or device (e.g. via device identifiers, IP addresses, login or account names, or any other such identifier), as well as whether the resource is modified (e.g. in the case of a document), whether the resource is used to access other resources (e.g. a hosted desktop used to access a document, etc.), or any other characteristics of access. In some implementations, access monitor 504 may identify one or more characteristics of a network connection with a client device 500, including IP address, geolocation information, WiFi identifier or SSID, VPN address, or any other such information. In some implementations, access monitor 504 may comprise a machine learning algorithm, such as a binary classifier, deep neural network, Bayesian classifier, or other such algorithm. Various input and output signals may be used for training and analysis, including whether a user departs an organization within a predetermined time period (e.g. allowing prediction of retention and thus engagement).

Figure 5B:
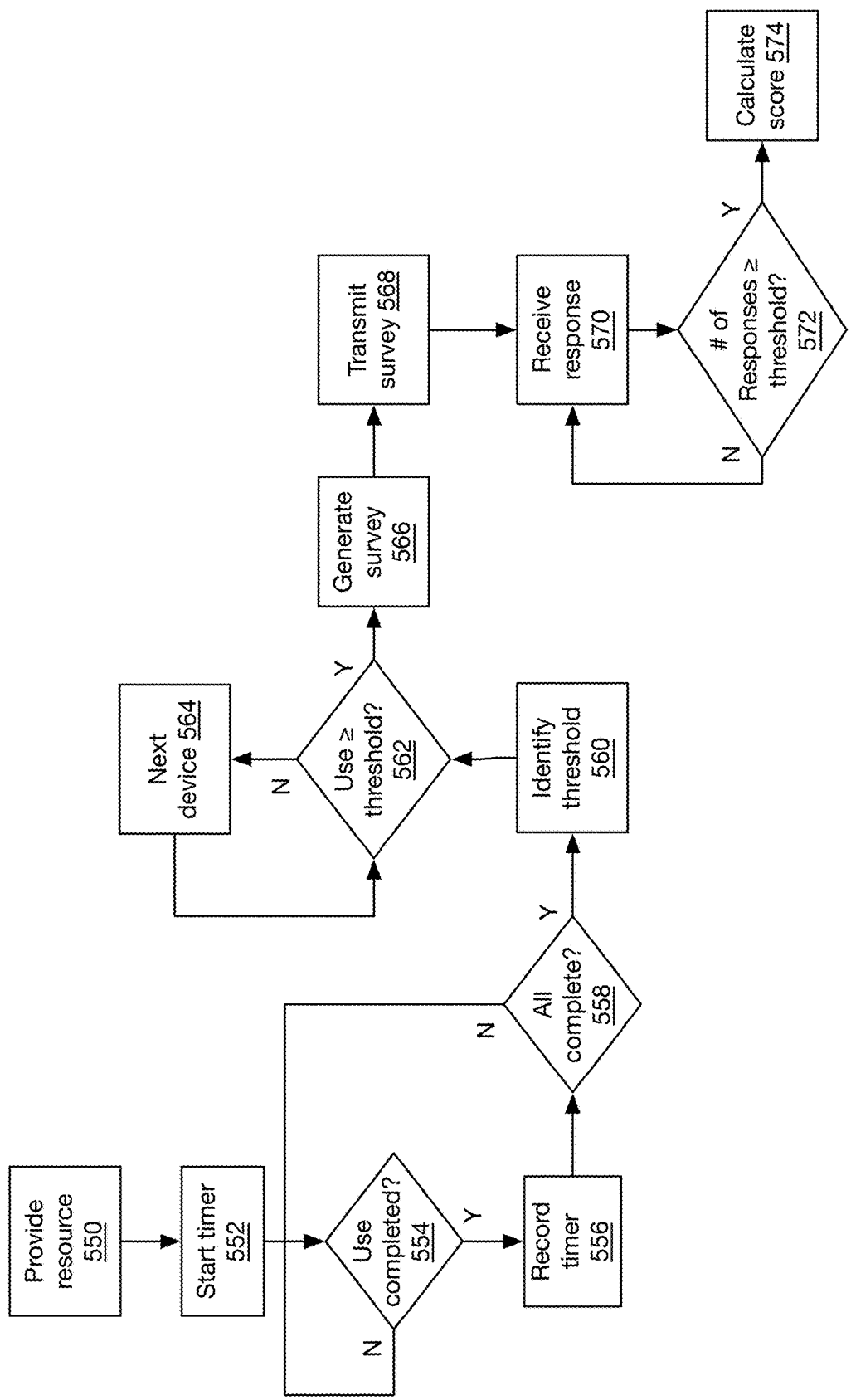
FIG. 5B is a flow chart of an implementation of a method for dynamically generating engagement surveys.

As discussed above, in some implementations, an access monitor 504 may be configured to dynamically generate engagement surveys and provide the surveys to users or devices on a real-time or near real-time basis. The surveys may be dynamically generated responsive to access to resources and characteristics of users, devices, or connections to the resources. FIG. 5B is a flow chart of an implementation of a method for dynamically generating engagement surveys. At step 550, an application server may provide access to a resource to a computing device, such as a hosted application or SaaS application, remote desktop, remote data storage or document, or other such resource. At step 552, responsive to providing access, the application server or an access monitor of the server may start a timer. The timer may be specific to the user, device, login, account, resource, network connection, or any combination of these or other characteristics. The timer may be maintained at step 554 until use of the resource is completed, at which point the timer value may be recorded in a log or database maintained by the access monitor at step 556. If other users or devices are accessing the resource at step 558, then steps 554-558 may be iteratively repeated. Although shown in series, in many implementations, multiple iterations of steps 550-558 may be performed simultaneously for different users, devices, accounts, or other entities, as well as for different resources. For example, a plurality of devices may access a first resource during a time period, with different devices initiating and terminating access at different times. The timers may be maintained separately for each device in such implementations.

Once access to the resource is complete, in some implementations, at step 560, the access monitor may identify a time of use threshold. The threshold may be preconfigured or set by an administrator or manager, or may be dynamically determined (e.g. based on an average duration of use of a plurality of devices or users; based on a $66^{th}$ percentile of use or any other such value; set above a lowest mode of a multimodal distribution of time of use (e.g. to filter out short access times likely to represent non-substantive effort, etc.); or via any other such method).

At step 562, a time of use for a device or user of the resource may be compared to the threshold. If the access time does not exceed the threshold, then at step 564, a next device may be selected. These steps may be iterated until identifying one or more devices or users with an access time exceeding the threshold. If a device or user is identified as having an access time above the threshold, they may be a major user and/or relevant to a project utilizing the resource. At step 566, a survey may be generated identifying the user or a user assigned to the device and the resource or a project associated with the resource. The survey may be provided to one or more other devices and/or users, such as each other user that utilized the resource during the time period (and are therefore likely to have worked with the user that is the subject of the survey). These surveys may be provided as push notifications to a mobile device or within a web browser, via email, or any other such means. The survey may be short, such as just a single question or rating (e.g. 1-5 stars, or any other such value). As the survey may be provided shortly after access of the resource is complete, the user's performance may be easily recalled by other users, increasing accuracy and relevance of the survey results.

At step 570, responses to the survey may be received from one or more of the devices to which the survey was provided. At step 572, the access monitor may determine whether the number of responses exceeds a threshold; if not, then steps 570-572 may be repeated, and in some implementations, the surveys may be retransmitted at step 568. Once the number of received surveys is above the threshold, at step 574, a score may be calculated for the user. The score may be an average of the received scores, a geometric mean of the received scores, or any other such method. In some implementations, steps 566-574 may be repeated for additional users or devices having access durations above the threshold at step 562.

In order to properly identify relevant users for surveys at steps 562-566, in some implementations, duration of access of the resource may be adjusted by a weight based on, for example, a position or title of the corresponding user. For example, access by a manager or senior person may be more heavily weighted in such implementations (e.g. a 1.5 or 2 times multiplier, or any other such value) in order to reflect the likelihood that they are highly relevant to the project. The weighting coefficients may be assigned by a manager or administrator of the system in some implementations, and may be stored in a lookup table or other data structure, associated with each user and/or a user group, type, or title (e.g. supervisor, partner, associate, engineer, etc.).

Scores calculated step 574 may be transmitted in various implementations to the user or a device of the user that was the subject of a survey, to a user's manager or supervisor (e.g. identified via a lookup table or employee database), to a training supervisor, or any other such entities. The scores may give dynamic, immediate, and near real-time feedback of performance of each user or employee within an enterprise.

As discussed above, in many implementations, users or enterprise employees may access resources such as hosted desktops, SaaS applications, web applications, network data storage, or other such resources from a variety of locations. Some of these locations may be at an enterprise location or office, while other locations may include the user or employee's home, local businesses or co-working spaces, etc. It may be useful for measuring employee engagement to determine whether a user or employee has the flexibility to work from locations of their preference. Because the users or employees are accessing resources provided by the application server, it may be possible to track the locations of access over time in order to measure this location flexibility.

Figure 6A:
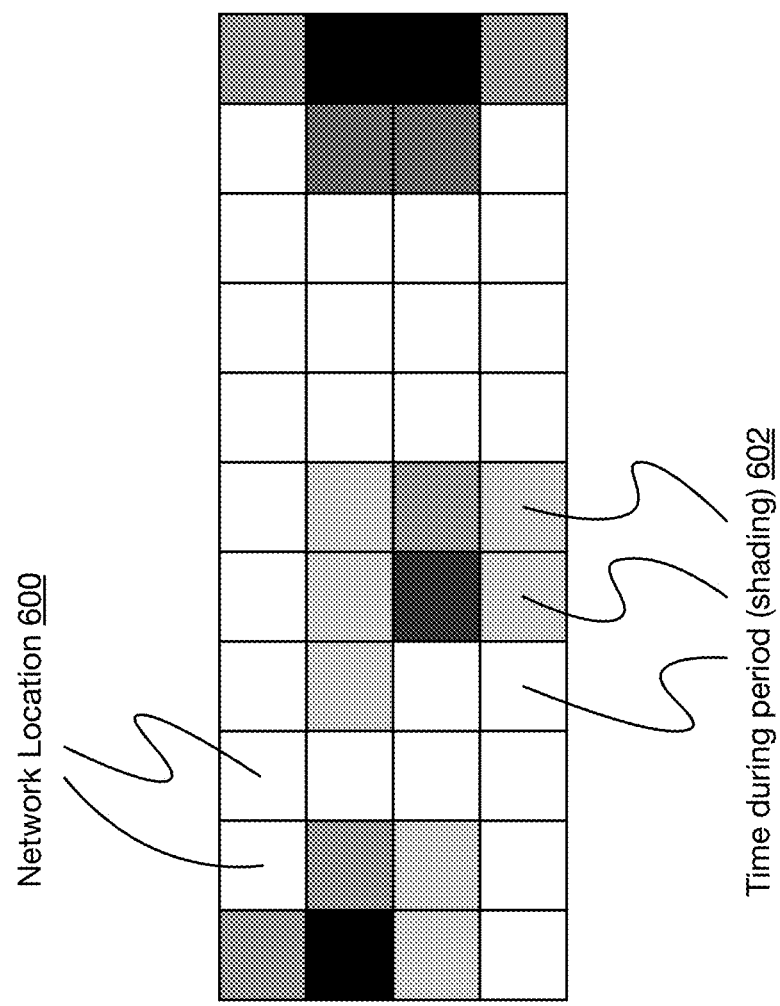
FIG. 6A is an illustration of a heatmap of network locations and usage, according to one implementation.

For example, FIG. 6A is an illustration of a heatmap of network locations and usage, according to one implementation. A user may access hosted applications or desktops from a variety of network locations 600, which may be physical locations (geographic locations) or logical locations (IP addresses or ranges, VPN providers or ISPs, etc.). A heat map may be generated from a log of these accesses over time, with frequency or duration of access indicated in shading 602 in the example illustration. By tracking these locations and frequency, the enterprise may determine whether a user or employee is spending more than an average amount of time at an office, at home, or elsewhere.

Figure 6B:
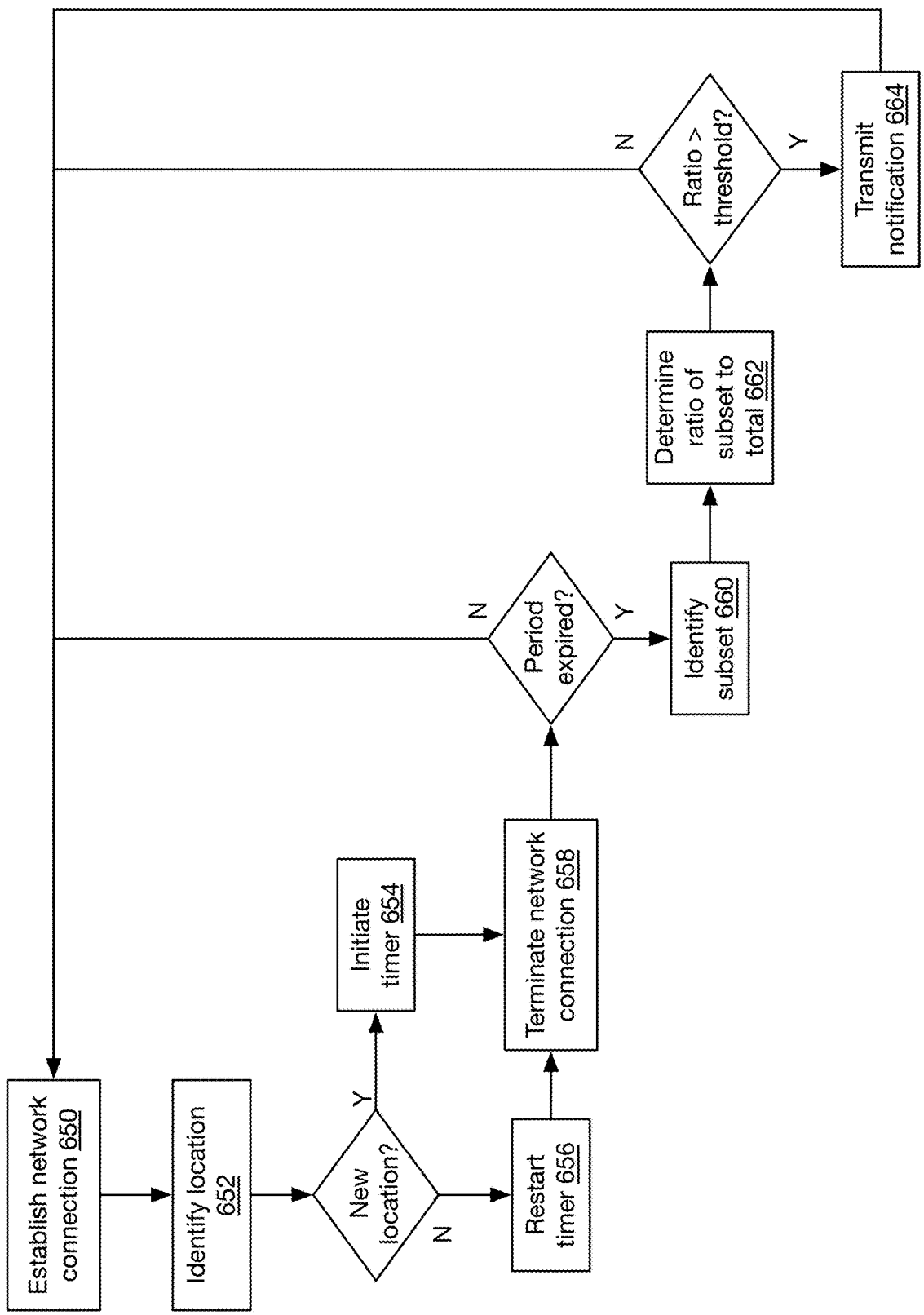
FIG. 6B is a flow chart of an implementation of a method for tracking user engagement.

FIG. 6B is a flow chart of an implementation of a method for tracking user engagement based on location of access. The method may be performed periodically or over a predetermine time period (e.g. a week, a month, a year, or any other such interval) and may be performed for a plurality of users and/or devices in parallel in order to track and measurement engagement for users and/or groups of users.

At step 650, a device may establish a network connection and access resources provided by an application server, such as a hosted desktop, SaaS or web application, or other such resource as discussed above. The network connection may be established via any type and form of network or networks, including via a VPN, local network, the Internet, cellular network, or any combination of these or other networks.

At step 652, the device and/or application server may identify a location of the device establishing the network connection. The location may be based on geolocation of the device through location services (e.g. WiFi or GPS triangulation), or via IP-based location of the device, or any other such means. For example, in some implementations, the location may be determined based on a broadcast SSID of a WiFi network accessed by the device (e.g. an SSID used by the enterprise for WiFi access within its offices). In other implementations, the location may be determined implicitly via latency measurements to a predetermined destination (e.g. a router of the enterprise), with shorter latency indicating connection within an Intranet, and longer latency indicating connection from outside the Intranet via other links.

If the location is a new location, then a timer or counter for the network connection may be initiated in some implementations at step 654. If the location is not a new location, then another timer or counter corresponding to the location may be restarted or resumed at step 656. The timers or counters may, in various implementations, measure a total time spent connected to the network connection, a total amount of data transmitted and/or received via the network connection, a frequency of connection to the network connection within a predetermined time period (e.g. once per month, twice per week, thrice per day, etc.). In some implementations, multiple physical locations may correspond to a single location for measurement purposes. For example, an enterprise may maintain multiple connections to an Intranet, including cellular microcells, WiFi access points, and wired Ethernet connections, and a user may connect variously via a smartphone, tablet computer, and desktop computer. In some implementations, all of these connections may be aggregated as connections at a single location, e.g. an enterprise office. Thus, each location may have a physical location and also a logical location, and several physical locations or connections may share a logical location.

At step 658, the network connection may be terminated, and the timer or counter stopped. If the measurement period (e.g. week, month, year, etc.) has not expired, then steps 650-658 may be repeated. If the measurement period has expired, then at step 660, in some implementations, the device or application server may identify a subset of the locations corresponding to a predetermined location (e.g. enterprise office, a home, etc.) or a single logical location as discussed above. At step 662, the device or application server may determine a ratio of the timer or counter value corresponding to the subset of locations to a total of the timer or counter values corresponding to all of the network connections utilized during the time period (e.g. a ratio of connections at the enterprise office to connections anywhere within the measurement period). If the ratio is not above a threshold, then the process may repeat for a next time period. If the ratio is above a threshold, then at step 664, a notification may be transmitted to another computing device, such as a computing device of a manager or supervisor.

The threshold may be preset by an administrator or manager, or may be dynamically determined from an average of ratios of network connections of a plurality of devices, or any other such function (e.g. 66% of averages, etc.). This may allow the enterprise to quickly identify users or employees with unusual work routines that may be representative of low engagement.

Thus, the systems and methods discussed herein provide a machine learning system that may monitor usage of network or hosted resources by users or employees, and may dynamically generate short or "micro" surveys for immediate presentation. These surveys may be aggregated and analyzed by the machine learning system, reducing delays of responses. As a result, engagement may be measured in real-time or near real-time, actionable insights generated, and responsive actions taken. The machine learning system may monitor various interactions of users or employees with a virtual or hosted environment or workspace, including connections to virtual machines, remote desktop applications, SaaS applications, web applications, or other such entities, as well as environmental characteristics such as network location and/or quality, Various elements, which are described herein in the context of one or more embodiments, may be provided separately or in any suitable subcombination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It will be further understood that various changes in the details, materials, and arrangements of the parts that have been described and illustrated herein may be made by those skilled in the art without departing from the scope of the following claims.

We claim:

1. A method, comprising:
providing, by a server, access to a resource to a first computing device of a plurality of computing devices via a connection between the server and the first computing device;
responsive to establishing the connection between the server and the first computing device, initiating a timer, by the server, to monitor use of the resource by the first computing device;
detecting, by the server, termination of the connection between the server and the first computing device;
based on detecting termination of the connection, adjusting, by the server, a duration indicating a length of time of a time period, measured by the timer, beginning at a connection time in which the first computing device established the connection between the server and the first computing device and ending at a termination time of the detected termination based on a coefficient for the first computing device, the coefficient being indicative of a role of a user of the first computing device;
comparing, by the server, the adjusted duration to a threshold;
determining, by the server, that the adjusted duration exceeds the threshold; and
responsive to the determination:
generating, by the server, a survey identifying the user of the first computing device, and
transmitting the generated survey, by the server, to at least one of the plurality of computing devices other than the first computing device based on detecting that the at least one of the plurality of computing devices established a connection to the resource during the time period.

2. The method of claim 1, further comprising identifying completion of use of the resource by identifying transmission of a document generated using the resource to a second computing device.

3. The method of claim 1, further comprising determining the threshold as an average duration of lengths of time of time periods in which the plurality of computing devices maintained a connection with the server.

4. The method of claim 1, further comprising receiving a plurality of responses to the generated survey, by the server from each of the plurality of computing devices other than the first computing device; and aggregating the plurality of responses.

5. The method of claim 4, further comprising transmitting the aggregated plurality of responses to the first computing device.

6. The method of claim 4, wherein aggregating the plurality of responses further comprises generating an aggregated score from a plurality of scores of the corresponding plurality of responses.

7. A system for generating user engagement surveys, comprising:
a server providing access to a resource to a first computing device of a plurality of computing devices via a connection between the server and the first computing device, the server configured to:
responsive to establishing the connection between the server and the first computing device, initiate a timer to monitor use of the resource by the first computing device;
detect termination of the connection between the server and the first computing device;
based on detecting termination of the connection, adjust a duration indicating a length of time of a time period, measured by the timer, beginning at a connection time in which the first computing device established the connection between the server and the first computing device and ending at a termination time of the detected termination based on a coefficient for the first computing device, the coefficient being indicative of a role of a user of the first computing device;

compare the adjusted duration to a threshold, determine that the adjusted duration exceeds the threshold, and responsive to the determination:

generate a survey identifying the user of the first computing device; and transmit the generated survey to at least one of the plurality of computing devices other than the first computing device, based on detecting that the at least one of the plurality of computing devices established a connection to the resource during the time period.

8. The system of claim 7, wherein the server is further configured to identify transmission of a document generated using the resource to a second computing device.

9. The system of claim 7, wherein the server is further configured to determine the threshold as an average duration of lengths of time of time periods in which the plurality of computing devices maintained a connection with the server.

10. The system of claim 7, wherein the server is further configured to receive a plurality of responses to the generated survey from each of the plurality of computing devices other than the first computing device; and aggregate the plurality of responses.

11. The system of claim 10, wherein the server is further configured to transmit the aggregated plurality of responses to the first computing device.

12. The system of claim 10, wherein the server is further configured to generate an aggregated score from a plurality of scores of the corresponding plurality of responses.

13. A non-transitory computer-readable medium comprising instructions encoded thereon that, when executed by a processor of a server, cause the server to:

provide access to a resource to a first computing device of a plurality of computing devices via a connection between the server and the first computing device;

responsive to establishing the connection between the server and the first computing device, initiate a timer to monitor use of the resource by the first computing device;

detect termination of the connection between the server and the first computing device, based on detecting termination of the connection, adjust a duration indicating a length of time of a time period, measured by the timer, beginning at a connection time in which the first computing device established the connection between the server and the first computing device and ending at a termination time of the detected termination, based on a coefficient for the first computing device, the coefficient being indicative of a role of a user of the first computing device;

compare the adjusted duration to a threshold;

determine that the adjusted duration exceeds the threshold; and responsive to the determination:

generate a survey identifying the user of the first computing device, and transmit the generated survey to at least one of the plurality of computing devices other than the first computing device, based on detecting that the at least one of the plurality of computing devices established a connection to the resource during the time period.

14. The computer-readable medium of claim 13, further comprising instructions that, when executed by the processor of the server, cause the server to identify transmission of a document generated using the resource to a second computing device.

15. The computer-readable medium of claim 13, further comprising instructions that, when executed by the processor of the server, cause the server to determine the threshold as an average duration of lengths of time of time periods in which the plurality of computing devices maintained a connection with the server.

* * * * *